United States Patent [19]

Barzynski et al.

[11] 4,113,593
[45] Sep. 12, 1978

[54] BENZOPHENONE-CONTAINING PHOTOPOLYMERIZABLE BINDERS FOR PRINTING INKS AND COATING COMPOSITIONS

[75] Inventors: Helmut Barzynski, Bad Durkheim; Guenter Heil, Ludwigshafen, both of Fed. Rep. of Germany

[73] Assignee: BASF Aktiengesellschaft, Ludwigshafen, Fed. Rep. of Germany

[21] Appl. No.: 834,796

[22] Filed: Sep. 19, 1977

Related U.S. Application Data

[63] Continuation of Ser. No. 634,877, Nov. 24, 1975, abandoned.

[30] Foreign Application Priority Data

Dec. 10, 1974 [DE] Fed. Rep. of Germany ....... 2458345

[51] Int. Cl.² ........................... C08F 8/18; C08F 2/46

[52] U.S. Cl. ............................ 204/159.15; 96/115 P; 204/159.16; 204/159.18; 204/159.19; 204/159.23; 260/42.28; 260/42.52; 260/836; 260/837 R; 260/859 R; 427/54; 428/203; 428/209; 428/211; 428/425

[58] Field of Search ................. 204/159.15, 159.16, 204/159.18, 159.23; 96/115 P

[56] References Cited

U.S. PATENT DOCUMENTS

| | | | |
|---|---|---|---|
| 3,915,824 | 10/1975 | McGinniss | 204/159.23 |
| 3,926,638 | 12/1975 | Rosen et al. | 96/115 R |
| 3,966,573 | 6/1976 | Bean | 204/159.23 |
| 4,004,998 | 1/1977 | Rosen | 204/159.22 |
| 4,067,791 | 1/1978 | Konno et al. | 204/159.15 |

Primary Examiner—Richard B. Turer
Attorney, Agent, or Firm—Keil, Thompson & Shurtleff

[57] ABSTRACT

Photopolymerizable binders for UV-curing printing inks and coating compositions, which contain benzophenone-based photoinitiators and photosensitizers including p-dimethylaminobenzaldehyde and esters of p-dimethylaminobenzoic acid.

14 Claims, No Drawings

BENZOPHENONE-CONTAINING PHOTOPOLYMERIZABLE BINDERS FOR PRINTING INKS AND COATING COMPOSITIONS

This is a continuation, of application serial no. 634,877, filed November 24, 1975, now abandoned.

The present invention relates to photopolymerizable binders for UV-curing printing inks and coating compositions which contain photoinitiators based on benzophenone, and, as photosensitizers, p-dimethylaminobenzaldehyde or esters of p-dimethylaminobenzoic acid.

It is known that the rate of photopolymerization of vinyl monomers by means of actinic UV light can be accelerated by adding photoinitiators, e.g. benzoin ethers or benzophenone, with hydrogen donors as reducing agents. Details are to be found, i.e., in B. J. Kosar "Light Sensitive Systems", J. Wiley and Sons Inc. 1965, pages 158–193.

The curing of photopolymerizable compositions to produce coatings, surface finishes or printing plates is a practical application of photopolymerization. To achieve high production speeds, it is necessary to use very effective photoinitiators as well as monomer systems which polymerize rapidly. In UV-curing of films of printing inks, which are applied at printing speeds of up to 300–400 m/minute and must be cured equally rapidly, even higher speeds are needed. The conventional photoinitiators are unsuitable for this purpose, on the one hand because their own absorption in pigmented systems is very low and the light absorption of most pigments is very high and, on the other hand, because the coating thickness is so low that the rate of formation of free radicals which initiate polymerization, and the degree of utilization of the incident light, are low. Where benzoin ethers are used, an additional problem is that if monomer systems which polymerize extremely rapidly are employed the shelf life of the photopolymerizable compositions in the dark is inadequate.

A photoinitiator system which is suitable because of its high light absorption, its high rate of formation of free radicals and its lack of effect upon the shelf life in the dark is a synergistic mixture of p,p'-dimethylaminobenzophenone (Michler's ketone) and benzophenone, as disclosed in German Published Application No. 1,522,359. The Michler's ketone, which has a high absorption, acts as a type of "sensitizer" for the benzophenone, which has a poor light absorption in the same actinic wavelength range (see also G. S. Hammond in J. Amer. Chem. Soc. 92 (1970), 6362). This photoinitiator mixture has proved very suitable for the photopolymerization of very thin pigmented layers, as produced, e.g. in offset printing or letterpress printing with polymerizable printing inks.

However, this mixture of Michler's ketone and benzophenone has disadvantages for some applications. Michler's ketone is only sparingly soluble at room temperture in most organic solvents and above all in vinyl monomers. It therefore has to be introduced in a very finely divided solid form, or as a supersaturated solution, into the printing ink if concentrations of more than about 2.5% are needed. However, in that case crystallization to give coarser crystals takes place after a period of storage, and these coarser crystals generally interfere with the use of the product and further more reduce the rate of curing. In addition, if Michler's ketone is used the cured coatings exhibit severe yellowing, which is particularly objectionable in unpigmented or white-pigmented systems.

It is an object of the present invention to provide sensitizers for benzophenone and benzophenone derivatives which have poor absorption in actinic UV light, which sensitizers have a high absorption in UV light of from 300 to 380 nm and have a similar effect to Michler's ketone but do not suffer from the disadvantages of the latter.

We have found that this object is achieved by using, as photoinitiators in binders for UV-curing printing inks and coating compositions based on one or more polymerizable olefinic compounds, a mixture of (a) benzophenone or a benzophenone derivative which has a relatively low absorption at from 300 to 380 nm and (b) p-dimethylaminobenzaldehyde or an ester of p-dimethylaminobenzoic acid, optionally mixed with small amounts of Michler's ketone.

Binders which may be used are all conventional polymerizable olefinic compounds suitable for use in printing inks, e.g. esters or amides of unsaturated carboxylic acids, such as acrylic acid or methacrylic acid, vinyl esters, N-vinyl compounds, allyl compounds of allyl alcohol and polyfunctional isocyanates or polyfunctional carboxylic acid esters, unsaturated epoxy resins and unsaturated polyurethanes. Prepolymers with molecular weights of from 300 to 1,200, especially of from 400 to 800, which have been manufactured by reaction of acrylic acid or methacrylic acid with hydroxy compounds, epoxy compounds or isocyanate compounds, are preferred; examples are acrylic acid esters of aliphatic or cycloaliphatic polyols, wherein some of the hydroxyl groups may be modified with isocyanates or relatively long-chain fatty acids, epoxy-acrylates obtained from polyepoxides, e.g. based on bisphenol A and epichlorohydrin, and acrylic acid or methacrylic acid, reaction products of acrylic acid with epoxidized drying oils or unsaturated fats, and urethane-acrylates obtained from preferably aliphatic or cycloaliphatic polyisocyanates and acrylic acid or methacrylic acid. These prepolymers are in general employed as mixtures with low molecular weight acrylic acid esters or N-vinyl compounds. Particularly preferred mixtures are those of urethane-acrylates, on the one hand, and copolymerizable epoxyacrylates or N-divinyl compounds, on the other, as disclosed, e.g., in German Published Application No. 2,358,948 or German Published Application No. 2,441,148, which are incorporated herein by reference.

The photoinitiators according to the invention can, of course, also be employed in other photopolymerizable coating compositions which are applied in thin layers of up to about 30μ. Examples include copying compositions for coating offset printing plates, photo-lacquer transfer films and fluid photoresist compositions, p-Dimethylaminobenzaldehyde readily dissolves in amounts of up to 10% in the above monomer or prepolymer systems. The photoinitiator activity of the mixture with benzophenone corresponds to that of the mixture of Michler's ketone and benzophenone. Whilst yellowing is somewhat reduced compared to the said conventional initiator system it is still too high for some colorless systems. p-Dimethylaminobenzaldehyde, used in placed of Michler's ketone, or as a mixture with such amounts of Michler's ketone as do not exceed its solubility, is therefore particularly suitable for pigmented photopolymerizable systems which have a high absorption and in which yellowing is not objectionable, but which must be curable with an irradiation time of fractions of a second. p-Dimethylaminobenzaldehyde has no detectable adverse effect on the shelf life in the dark, and in some cases even improves the latter.

p-Dimethylaminobenzoic acid esters are also outstandingly soluble. The solubility can be matched to particular requirements, within very wide limits, by appropriate selection of the alcohol component, which may be of low or high molecular weight. The mixtures of the esters with benzophenone cause extremely little yellowing, so that they are particularly suitable for unpigmented and white-pigmented coatings. The photoactivity of the mixtures is somewhat less than that of the mixture of Michler's ketone and benzophenone and is comparable with that of the benzoin ethers. However, because of its higher absorption and its lack of effect upon the shelf life, the mixture of benzophenone and p-dimethylaminobenzoic acid ethers is superior to the best benzoin ethers, particularly in extremely rapidly polymerizing acrylic acid ester systems and in pigmented systems. p-Dimethylaminobenzoic acid esters to be used above all are those of the general formula

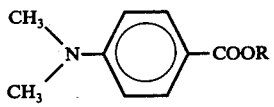

where R is alkyl of 1 to 12 carbon atoms, aryl of 6 to 14 carbon atoms or cycloalkyl or aralkyl of 6 to 40 carbon atoms. The radical R may also contain a second p-dimethylaminobenzoate group.

The choice of the alcohol component with which the p-dimethylaminobenzoic acid is esterified is not critical as far as the activity of the product, and yellowing, are concerned, provided the alcohol component does not contain chromophoric groups or other structural elements which may interfere with the sensitization. For reasons of ease and economy of manufacture, lower aliphatic alcohols, e.g. methanol, ethanol, propanols or butanols, are preferred. Esters obtained by reaction of the acid with glycidyl compounds, e.g. epoxy resins based on bisphenol A, are also suitable. This latter reaction gives sensitizing resins, the resinous properties of which may in addition be turned to advantage for the photopolymerization. The reaction products of epoxy resins, having molecular weights of less than 2,000, with from 40 to 96 mole percent of p-dimethylaminobenzoic acid per mole of epoxide groups, being particularly simple to manufacture, and the esters of p-dimethylaminobenzoic acid with simple alcohols, are the preferred esters. For use in UV-curing printing inks and overprinting varnishes, relatively low molecular weight bisphenol A epoxy resins with molecular weights of less than 1,000, and in particular from 350 to 500, have proved particularly suitable. The esterification of the acid with the epoxy resins is carried out by the conventional processes of reaction of an epoxy with an acid. p-Dimethylaminobenzoic acid can also be esterified with other hydroxyl-containing resins, e.g. partially saponified polyvinyl acetate, or hydroxyl-containing polyesters.

The p-dimethylaminobenzaldehyde or p-dimethylaminobenzoic acid esters and the benzophenone or its derivatives are employed in a weight ratio of from 1:15 to 10:1, preferably from 1:4 to 1:1. The use of equimolar amounts of aldehyde or ester and benzophenone is particularly preferred, i.e. one aldehyde-carbonyl or ester-carbonyl group is employed per keto-carbonyl group in the benzophenone or benzophenone derivative.

In place of the unsubstituted benzophenone it is also possible to use benzophenone derivatives, e.g. benzophenones substituted by halogen, halogenoalkyl, alkyl or alkoxy, as well as o- or p-substituted benzophenonemonocarboxylic acid esters, and benzophenone-dicarboxylic acid esters or benzophenone-tetracarboxylic acid esters. Benzophenone-carboxylic acid esters manufactured from o- or p-benzophenone-carboxylic acid and an epoxy resin, analogously to the reaction of p-dimethyl-aminobenzoic acid with epoxies, and using, if desired, the same epoxies as in the latter reaction, prove particularly advantageous.

In some cases it is advantageous to use p-dimethylaminobenzoic acid esters or benzophenonecarboxylic acid esters which contain olefinic copolymerizable groups, e.g. acrylic acid ester groups, in the alcohol radical. Such unsaturated photoinitiators and photosensitizers may be obtained by various methods, e.g. by reacting the acids with glycidyl acrylate or reacting them with an epoxy resin containing at least 2 epoxide groups in the molecule, of which one is reacted with acrylic acid. However, the aminobenzoic acid and the benzophenone-carboxylic acid can also be esterified with other hydroxyl-containing acrylic acid esters, e.g. hydroxyethyl acrylate, hydroxypropyl acrylate, butanediol monoacrylate or trimethylolpropane diacrylate.

The photoinitiators of the invention may be employed advantageously in amounts of from 1 to 30 percent by weight, based on unpigmented binder. The preferred amounts are from 3 to 10 percent by weight for the low molecular weight initiators and from 10 to 25 percent by weight for the resins. The content of Michler's ketone should at the same time be at most 2.5 percent by weight. As a rule, the binders do not contain solvent, thereby avoiding problems of pollution of the environment. However, for special purposes it may be advantageous to add up to 5 percent by weight of conventional solvents for printing inks, where there are compatible.

The binders may be used for the manufacture of UV-curing printing inks, surface-coating varnishes or overprinting surface-finishes. The printing inks and coating compositions suitably contain, in addition to the binder, from 0 to 60 percent by weight of conventional pigments, preferably from 5 to 20 percent by weight, of colored pigments or from 20 to 60 percent by weight of white pigments, based on the total composition. They can furthermore contain conventional dyes, fillers, flow control agents, inhibitors, waxes and thixotropic agents.

EXAMPLE 1

(a) A printing ink binder was manufactured by homogeneously mixing 20 parts by weight of a urethane-acrylate manufactured from a biuret-isocyanate based on hexamethylenediisocyanate (Desmodur N, from Bayer AG) and the stoichiometric amount of hydroxypropyl acrylate, 64 parts by weight of a urethane-acrylate manufactured from hexamethylenediisocyanate and the stoichiometric amount of hydroxypropyl acrylate, 10 parts by weight of butanediol diglycidyl ether diacrylate, 3 parts by weight of p-dimethylaminobenzaldehyde, 3 parts by weight of benzophenone and 0.15 parts by weight of phenothiazine as the polymerization inhibitor.

(b) A printing ink binder was manufactured as described under (a), except that 3 parts by weight of Michler's ketone was used in place of p-dimethylaminobenzaldehyde.

(c) A printing ink binder was manufactured analogously to (b) with a mixture of 2 parts by weight of Michler's ketone and 1 part by weight of p-dimethylaminobenzaldehyde in place of 3 parts by weight of Michler's ketone.

All three binders were stored for two months at room temperature. After this time, binders (a) and (c) according to the invention were still completely clear whilst binder (b) was turbid and gritty as a result of the presence of a small amount of white crystals.

On exposing a 1μ thick layer on art printing paper in a flat sheet exposure apparatus fitted with low pressure fluorescent tubes (see, e.g., German Published Application 2,358,948), the binders having been freshly prepared, the following exposure times were needed to give a tack-free film
  (a) 6 seconds
  (b) 5 seconds
  (c) 5 seconds

EXAMPLE 2

(a) The binder from Example 1 (a) was provided with 3 parts by weight of Michler's ketone and a further 3 parts by weight of benzophenone and pigmented with 18 parts by weight of a phthalocyanine blue pigment, namely Heliogenblau 7080, per 82 parts by weight of binder. The additional amounts of photoinitiator were not dissolved in the binder, but milled together with the pigment.

(b) 0.5 part by weight of Michler's ketone and a further 2.5 parts by weight of p-dimethylaminobenzaldehyde and 3 parts by weight of benzophenone were dissolved in the binder from Example 1(c) and 82 parts by weight of the clear mixture were ground with 18 parts by weight of Heliogenblau 7080.

After 2 months' storage at room temperature, the printing ink manufactured according to process (a) exhibited fine crystal grains, which interfere with the distribution of the ink in the inking unit of the printing machine and result in a poorer print. The ink was of a thicker consistency than immediately after its manufacture.

The printing ink manufactured according to process (b) showed no change after the same period of storage.

Immediately after their manufacture, both printing inks dried equally rapidly in UV light. After storage, the speed of drying of ink (a) had decreased relative to ink (b).

EXAMPLE 3

(a) A colorless overprinting varnish was produced by homogeneously mixing 30 parts by weight of a urethane-acrylate, obtained from the biuret-isocyanate according to Example 1 and hydroxypropyl acrylate, 43 parts by weight of a urethane-acrylate from hexamethylenediisocyanate and hydroxypropyl acrylate, 15 parts by weight of N,N'-divinylpropyleneurea, 6 parts by weight of p-dimethylaminobenzoic acid ethyl ester, 6 parts by weight of benzophenone and 0.15 parts by weight of phenothiazine.

a 5μ layer of the clear and colorless overprinting varnish was applied to paper on top of a dry multi-color print and irradiated for 1.5 seconds, at 20 cm distance, under a mercury high-pressure lamp (power consumption 36 watt/cm of arc length). A clear, very glossy, colorless coating which was completely dry and hard, when tested with the fingernails, was obtained.

The varnish was unchanged after 6 months' storage at room temperature.

(b) For comparison, the same varnish was produced without p-dimethylaminobenzoic acid ethyl ester. The exposure time required to cure the varnish is more than 10 seconds. In other respects the results are comparable.

(c) In place of p-dimethylaminobenzoic acid ethyl ester, the methyl ester was employed. The results are comparable, showing no detectable differences.

(d) The isopropyl ester was employed. The results are comparable.

(e) The n-butyl ester was employed. The results are comparable. p (f) The benzyl ester was employed. The results are comparable.

(g) For comparison, the ethyl ester was employed without added benzophenone. No curing occurred in 20 seconds.

EXAMPLE 4

(a) 70 g of p-dimethylaminobenzoic acid, 160 g of a bisphenol A epoxy resin having an epoxide value of 0.52, and 0.7 g of $SnCl_2.2H_2O$ and 1.8 g of trimethylphenylammonium methylsulfonate, as esterification catalysts, are mixed in a stirred flask and stirring was continued for about three hours at 95° C., until tetration of samples showed an acid content of less than 0.2%. After cooling, a pale yellow-brown brittle sensitizer resin is obtained.

(b) A colorless coating mixture is prepared by homogeneously mixing, at 70° C., 20 parts by weight of the sensitizer resin prepared according to a, 8 parts by weight of a urethane-acrylate obtained from the biuret-isocyanate according to Example 1 and hydroxypropyl acrylate, 51 parts by weight of a reaction product of hexamethylenediisocyanate with hydroxypropyl acrylate, 15 parts by weight of N,N'-divinylpropyleneurea, 6 parts by weight of benzophenone and 0.15 parts by weight of phenothiatine.

A layer, about 3μ thick, of the lacquer is printed by means of a printing machine onto color-printed tinplate and is irradiated with a mercury high-pressure lamp having a power of 36 W/cm. After an exposure time of 1.5 seconds the coating was dry, tack-free and resistant to scratching with the fingernails. It showed hardly any yellowing, and was very glossy.

(c) The coating mixture from Example 4(b) is pigmented with titanium dioxide at 50% strength and is then offset-printed onto non-lacquered, clean, rolled steel plate, to give a layer about 4μ thick. After an exposure time of 3 seconds, the plates were dry and (the coating was) resistant to scratching with the fingernails.

On baking, e.g. for 10 minutes at 160° C., the sheets obtained showed a white lacquer, free from yellowing and having very good adhesion, scratch resistance and resistance to sterilization conditions.

EXAMPLE 5

(a) 202 g of a bisphenol A epoxy resin of epoxide value 0.52 are reacted with 192 g of benzophenonecarboxylic acid in the presence of 1.5 g of $SnCl_2.2H_2O$ and 3 g of the ammonium salt of Example 4(a), analogously to the reaction described in Example 4(a). A brittle, pale gray-brown initiator resin is obtained.

(b) A printing ink binder was prepared from
20 parts by weight of the sensitizer resin from Example 4(a),
15 parts by weight of the initiator resin from Example 5(a),
20 parts by weight of N,N'-divinylpropyleneurea,
45 parts by weight of a urethane-acrylate from hexamethylenediisocyanate and hydroxypropyl acrylate and
0.15 part by weight of phenothiazine.

A white tinplate printing ink is prepared by pigmenting with an equal amount by weight of titanium dioxide, printed and irradiated, as described in Example 4(c). The results are comparable.

We claim:

1. A binder for UV-curing coating compositions and printing inks, based on one or more polymerizable olefinically unsaturated compounds, which contains, as photoinitiator, a mixture of (a) a photoinitiator which consists essentially of benzophenone or a benzophenone derivative which has a relatively low absorption at from 300 to 380 nm and (b) a photosensitizer which has a stronger absorption in the same wavelength range, wherein the sensitizer (b) consists essentially of p-dimethylaminobenzaldehyde or an ester of p-dimethylaminobenzoic acid of the formula

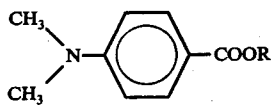

where R is alkyl of 1 to 12 carbon atoms, aryl of 6 to 14 carbon atoms or cycloalkyl or aralkyl of 15 to 40 carbon atoms and a second p-diemthylaminobenzoate group may be present in R.

2. A binder as set forth in claim 1, wherein the olefinically unsaturated compound or compounds are selected from esters and amides of unsaturated carboxylic acids, vinyl esters, N-vinyl compounds, allyl compounds, unsaturated epoxy resins and unsaturated polyurethanes, or mixtures of two or more of these materials.

3. A binder as set forth in claim 1, wherein a prepolymer of molecular weight of from 300 to 1,200, manufactured by reaction of acrylic acid or methacrylic acid with a hydroxy compound, epoxy compound or isocyanate compound, mixed with a low molecular weight acrylic acid ester or N-vinyl compound, is used as olefinically unsaturated compound.

4. A binder as set forth in claim 1, wherein the prepolymer is an acrylic acid ester of an aliphatic or cycloaliphatic polyol, an epoxy-acrylate from a polyepoxide and acrylic acid or methacrylic acid, or a urethane-acrylate from a polyisocyanate and acrylic acid or methacrylic acid.

5. A binder as set forth in claim 1, wherein the olefinically unsaturated compounds are a mixture of prepolymers based on urethane acrylates, and copolymerizable epoxy-acrylates or N-divinyl compounds.

6. A binder as set forth in claim 1, wherein component (a) of the photoinitiator is a benzophenone substituted by halogen, halogenalkyl, alkyl or alkoxy, an o- or p-substituted benzophenonemonocarboxylic acid ester or a benzophenonedicarboxylic acid ester or benzophenonetetracarboxylic acid ester.

7. A binder as set forth in claim 1, wherein component (a) of the photoinitiator is an ester of o- or p-benzophenonecarboxylic acid and an epoxy resin.

8. A binder as set forth in claim 1, wherein the sensitizer (b) comprises a p-dimethylaminobenzoic acid ester of methanol, ethanol, propanol or a butanol.

9. A binder as set forth in claim 1, wherein the sensitizer (b) comprises a reaction product of p-dimethylaminobenzoic acid with an epoxy resin based on bisphenol A and epichlorohydrin.

10. A binder as set forth in claim 1, wherein a reaction product of an epoxy resin, of molecular weight less than 2,000, with from 40 to 96 mole percent of p-dimethylaminobenzoic acid per mole of epoxide groups, is used as sensitizer (b).

11. A binder as set forth in claim 1, wherein the photoinitiator is used in a total amount of from 1 to 30 percent by weight, based on the unpigmented binder.

12. A binder as set forth in claim 1, wherein the sensitizer (b) also includes Michler's ketone present in an amount of at most 2.5 percent by weight, based on unpigmented binder.

13. A binder as set forth in claim 1, wherein the photoinitiator component (a) and the photoinitiator component (b) are employed in a weight ratio of from 1:15 to 10:1.

14. A binder as set forth in claim 13, wherein about one aldehyde-carbonyl or ester-carbonyl group is employed per ketocarbonyl group in the benzophenone or benzophenone derivative (a).

* * * * *